Patented Apr. 27, 1954

2,676,994

UNITED STATES PATENT OFFICE 2,676,994

VITAMIN A SYNTHESIS AND INTERMEDIATES THEREFOR

Donald M. Burness and Charles D. Robeson, Rochester, N. Y., assignors to Eastman Kodak Company, Rochester, N. Y., a corporation of New Jersey No Drawing. Application September 11, 1951, Serial No. 246,167

13 Claims. (Cl. 260—611)

1

This invention relates to methods of synthesizing vitamin A and to new and useful intermediates obtained in the synthesis.

The successful synthesis of vitamin A in sufficient yield for commercial production depends upon the selection out of the myriad possible reactions and reactants of a combination of reaction steps using particular reactants which will combine to produce vitamin A as a product and produce it in sufficiently high yield to be economically feasible. Since the biological activity of vitamin A active material depends upon a specific molecular structure, it is necessary that the synthesis yield a specific basic compound and not an isomer of the compound or a substituted structure similar to vitamin A. The successful synthesis of vitamin A is further complicated by the inherent instability of the complex polyenes of the vitamin A series and their tendency to isomerize, decompose or undergo undesirable side reactions. In many cases, merely a change in the order in which a particular combination of reactions is carried out will defeat the successful synthesis of vitamin A.

It is accordingly an object of this invention to provide a new and highly effective method of synthesizing vitamin A.

Another object of the invention is to provide a new combination of method steps which combine to produce the desired vitamin A molecular structure.

Another object of the invention is to provide an improved method of minimizing objectionable effects of decomposition, isomerization, and side reactions normally attendant to vitamin A syntheses.

Another object of the invention is to provide a new method of effectively converting β-ionone to vitamin A alcohol in good yield.

Another object of the invention is to provide a new synthesis of vitamin A involving dehydration of hydroxy polyenes but which effectively minimizes yield losses normally encountered during dehydration due to isomerization.

Another object of the invention is to synthesize vitamin A through hitherto unknown intermediates.

Another object of the invention is to provide new and useful vitamin A intermediates.

Another object of the invention is to convert β-ionone to vitamin A alcohol through vitamin A aldehyde.

Other objects will be apparent from the description and claims which follow.

These and other objects of the invention are attained by the process embodying this invention and comprising reacting an acetal of acetoacetaldehyde with a propinyl halide to form a carbinol, condensing the carbinol with β-ionone to form an acetylenic diol, hydrogenating the acetylenic diol to the corresponding olefinic diol, and converting the olefinic diol to vitamin A aldehyde which in turn can be reduced to vitamin A alcohol, the converting of the olefinic diol including dehydration, hydrolysis and treatment with a basic material either sequentially or simultaneously as described more fully hereinafter. The dehydration, hydrolysis, rearrangement and reduction which comprise the conversion of the olefinic diol to vitamin A alcohol can be effected in a succession of separate steps or in combinations of steps as described more fully hereinafter. Vitamin A alcohol as prepared by processes embodying the invention can, of course, be esterified by well-known esterification procedures to produce vitamin A esters such as the acetate or palmitate or similar esters, vitamin A usually being sold commercially in the form of esters.

The invention is illustrated by the following reactions and equations. The equations are set out as separate steps for illustrative purposes but it will be understood that one or more of the individual reactions can proceed in a single reaction mixture without isolation of the intermediates, although the intermediate can be isolated and the various steps carried out in succession if desired. Various mechanisms may be advanced to explain the observed results without changing the operative steps set out.

As an initial step in the processes embodying the invention, an acetal of acetoacetaldehyde is condensed with a propinyl halide such as propargyl bromide, propargyl chloride or propargyl iodide to form the carbinol, 1,1-dialkoxy-3-methyl-3-hydroxy-hex-5-yne. The condensation is effected by use of either zinc or magnesium; the use of magnesium being preferred. Particularly efficacious results are obtained when the magnesium is catalyzed by mercury, added either as elemental mercury or as a mercury compound such as mercuric chloride or similar mercury salt or as a preferred amalgam with magnesium. The reaction product is hydrolyzed to decompose the metallo-organic complex to the carbinol. The acetal is preferably a dialkyl acetal although the exact nature of the acetal grouping does not affect the course of the reaction. Thus any acetal of acetoacetaldehyde can be employed, the lower alkoxy compounds such as the dimethoxy, diethoxy, dipropoxy and dibutoxy acetals being preferred for convenience. The reaction of the propinyl halide and the acetal of acetoacetaldehyde is illustrated by the following equation wherein X is a halogen atom and R is an alkyl group:

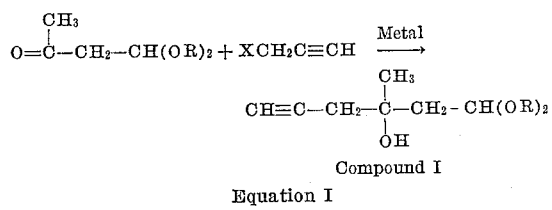

Equation I

The carbinol, Compound I, is then condensed with β-ionone by a Grignard type reaction preferably employing an alkyl magnesium halide in accordance with known chemical practices, such Grignard compounds as ethyl magnesium bromide, methyl magnesium bromide and the like being eminently suitable. The condensation whereby an acetylenic diol, 1,1-dialkoxy-3,7-dimethyl - 3,7 - dihydroxy - 9 - (2,6,6 - trimethyl-cyclohex-1-enyl)-nona-8-ene-5-yne, is formed is illustrated by the following equation wherein R is an alkyl group and X is a halogen atom.

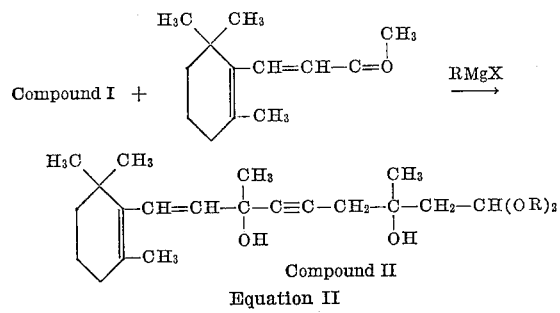

Equation II

The acetylenic diol, Compound II, is thereafter hydrogenated to the corresponding olefinic diol, 1,1 - dialkoxy - 3,7 - dimethyl - 3,7 - dihydroxy- 9 - (2,6,6 - trimethyl cyclohex - 1 - enyl) - nona-5,8 - diene, by partially hydrogenating the acetylenic linkage. The partial hydrogenation is readily effected by reacting substantially one molecular equivalent of hydrogen with Compound II in the presence of a hydrogenation catalyst such as palladium, Raney nickel or similar well-known hydrogenation catalyst in accordance with usual hydrogenation practices. The reaction is illustrated graphically as follows, R being an alkyl radical:

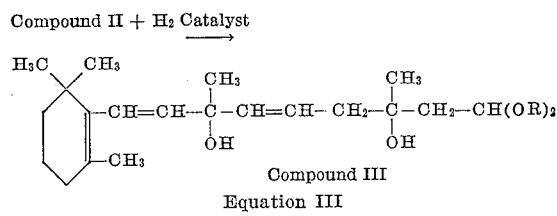

Equation III

The olefinic diol, Compound III, is thereafter converted to vitamin A alcohol by dehydration, hydrolysis, rearrangement and reduction. In a preferred embodiment, Compound III is treated with a dehydrating agent which is either a halide or an oxyhalide to dehydrate and convert Compound III to the enol ether, 1-alkoxy-3,7-dimethyl - 9 - (2,6,6 - trimethyl cyclohex - 2 - ene-1-ylidene)-nona-1,3,5,7-tetraene. The reaction is effected by treating Compound III, in solution in a suitable solvent such as benzene, toluene, ether or the like, with a halide or oxyhalide dehydrating agent, and desirably in the presence of a tertiary amine such as pyridine, lutidine or the like. Any of the well-known halide or oxyhalide dehydrating agents can be employed, typical dehydrating agents which are suitably employed including phosphorous oxychloride, benzene phosphorous oxydichloride, boron trifluoride, aluminum chloride, phosphorous pentachloride, stannic chloride and the like. Treatment with such dehydrating agents usually effects conversion of the acetal group to an ether group simultaneously with the dehydration. The following equation illustrates the reaction:

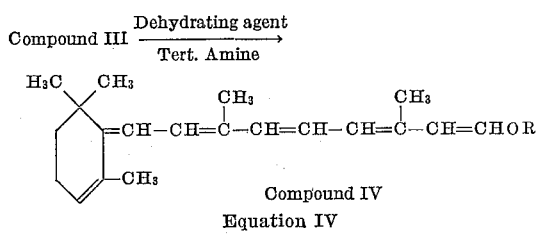

Equation IV

The enol ether, Compound IV, is readily hydrolyzed to Compound V for which the structure set out in Equation V has been postulated by treatment with an ionizable acid in accordance with well-known hydrolysis practice, a mineral acid such as hydrochloric, phosphoric, sulfuric or the like in solvent media such as acetone, methyl ethyl ketone or the like being desirably employed, although dilute aqueous acid can be employed or such well-known acids as acetic acid or the like. Equation V is illustrative of the reaction:

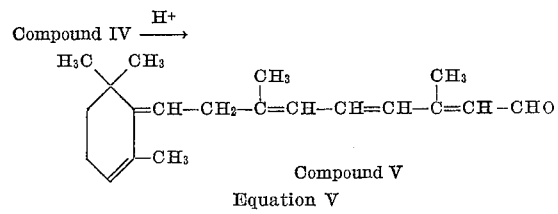

Equation V

Compound V is rearranged by treatment with a basic catalyst such as a basic amine, an alkaline soap, an alkaline hydroxide, an alkaline adsorbent, an alkali metal alkoxide, a quaternary ammonium base, a basic anion exchange resin, a basic salt, or similar material of basic character. Typical materials of basic character suitable for catalyzing the rearrangement include pyridine, sodium hydride, sodium hydroxide, potassium hydroxide, sodium aluminum silicate, aluminum isopropoxide, potassium acetate, lutidine, lithium aluminum hydride and other well-known basic materials. The rearrangement proceeds either at room temperature or at elevated temperatures with only a catalytic amount of basic material being necessary although larger amounts are not objectionable. By use of a basic adsorbent such as sodium aluminum silicate, the Compound V is purified and rearranged simultaneously. Basic reducing agents such as the ether-soluble basic metal hydrides and aluminum alkoxides cause rearrangement and reduction in a single reaction mixture as described more fully hereinafter. The rearrangement is illustrated in the following equation:

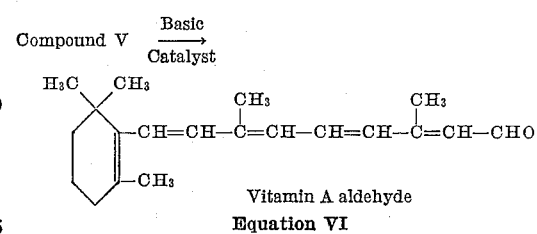

Vitamin A aldehyde

Equation VI

Vitamin A aldehyde is readily reduced to vitamin A alcohol by treatment with an ether-soluble metal hydride such as sodium aluminum hydride, lithium aluminum hydride, lithium borohydride or the like; by treatment with an aluminum alkoxide such as aluminum isopropoxide, aluminum tert.-butoxide or the like with the corresponding or other suitable monohydric alcohol; or by other well-known method of reducing olefinic aldehydes to olefinic alcohols. The reduction is effected in accordance with usual reduction practices. In the case of the basic reducing agents, the aldehyde, Compound V, is desirably treated directly with the reducing agent whereby the basic reducing agent catalyzes the rearrangement to vitamin A aldehyde and reduction to vitamin A alcohol in a single reaction mixture.

The conversion of the olefinic diol, Compound III, to vitamin A alcohol by dehydration, hydrolysis, rearrangement and reduction is desirably effected in a preferred embodiment by treating Compound III with a mixture of an ionizable acid, preferably a mineral acid, and an organic base such as pyridine, lutidine, quinoline, morpholine, piperidine or the like; or by treating it with an acid-organic base addition product such as pyridine hydrochloride, quinoline hydrobromide or the like, whereby Compound III is dehydrated, hydrolyzed and rearranged to vitamin A aldehyde in a single reaction mixture, the vitamin A aldehyde then being reduced to vitamin A alcohol as described hereinabove.

The invention is illustrated by the following examples of preferred embodiments. The ultraviolet absorption data (E values) in the following examples were determined in ethanol in accordance with usual practice.

Example 1

A mixture of 26.2 g. of iodine-activated zinc dust and 0.07 g. of copper acetoacetate was placed in a flask. To this mixture was added one third of a solution of 26.5 g. of the dimethoxy acetal of acetoacetaldehyde, 26.2 g. of propargyl bromide and 0.15 g. of hydroquinone in 200 ml. of absolute ether and 15 ml. of benzene, and the resulting mixture was warmed for about 10 minutes to initiate the reaction. The remainder of the solution was then added dropwise over a 30 minute period, the reaction mixture being refluxed and stirred during the addition. When the addition was completed, refluxing was continued for an additional 30 minutes. The metallo-organic complex was decomposed by the addition of saturated ammonium chloride solution, and the mixture was extracted with ether. The ether extract was dried over anhydrous sodium sulfate, and the solvent removed by evaporation to give 55-60 ml. of crude product. This product was fractionated under vacuum to give 20.04 g. of Compound I having a boiling point of 87-92° C. at 12 mm. Hg. Infrared analysis confirmed the presence of the triple bond and the hydroxyl group.

Example 2

A mixture of 1.34 g. of magnesium turnings, 10 ml. of absolute ether and 75 mg. of mercuric chloride was placed in a reaction flask. To this mixture was added a solution of 6.55 g. of propargyl bromide and 6.62 g. of the dimethoxy acetal of acetoacetaldehyde in 50 ml. of absolute ether. The reaction mixture was warmed for about 10 minutes to initiate the reaction; after which time the reaction proceeded vigorously without heating for 30 minutes while controlled by cooling in an ice-water bath. The mixture was then heated to reflux for an additional 30 minutes and was stirred during such additional reflux. A 5% solution of aqueous sulfuric acid was added cautiously to decompose the magnesium complex. The ether phase was separated from the aqueous phase, and the aqueous phase extracted with additional ether. The ether extracts were combined, washed with saturated sodium bicarbonate solution and dried over anhydrous sodium sulfate. The ether was removed by evaporation to give 7.88 g. of crude Compound I which was thereafter fractionated under vacuum to give 3.76 g. of Compound I having a boiling point of 60° C. at 3 mm. Hg.

Example 3

A 161-ml. portion of an ethereal solution of ethyl magnesium bromide prepared from 14.6 g. of magnesium foil, 65.5 g. of ethyl bromide and 210 ml. of absolute ether was transferred under nitrogen to a 3-necked flask equipped with a reflux condenser, a stirrer and a dropping funnel. To this solution was slowly added 32.99 g. of Compound I (B. P. 68.5-72 at 4 mm. Hg $n^{26}$ 1.4512) dissolved in 75 ml. of absolute ether, the addition being dropwise over a 20 minute period. The resulting mixture was refluxed gently overnight, and then 48.5 g. of β-ionone (95%) dissolved in 75 ml. of absolute ether was added at room temperature. The resulting reaction mixture was stirred for 2 hours, with refluxing during the final 30 minutes. The magnesium complex was decomposed with ammonium chloride solution, and the product worked up by separating the ether phase from the aqueous phase, extracting the aqueous phase with additional ether, combining the ether extracts, drying the ether extract and removing the ether by evaporation. The crude Compound II thus obtained weighed 68.9 g. and had $$E_{1\ cm.}^{1\%} (308\ m\mu) = 332$$

and $$E_{1\ cm.}^{1\%} (232\ m\mu) = 220$$

After purification by chromatography, the acetylenic diol, Compound II, was obtained having $$E_{1\ cm.}^{1\%} (232\ m\mu) = 115$$

Example 4

Four grams of the acetylenic diol, Compound II, were dissolved in 40 ml. of methyl alcohol containing 3 drops of quinoline and 0.55 g. of 5% palladium-charcoal. Hydrogen was passed into the solution and 367 ml. (1 molecular equivalent) of hydrogen was adsorbed in 15 minutes. The hydrogenation was continued for an additional 10 minutes during which time 18 ml. of additional hydrogen was absorbed for a total amount of 1.05 molecular equivalents of hydrogen. The reaction mixture was then diluted with 100 ml. of petroleum ether and filtered to remove the catalyst. The ether phase was washed with 5% sulfuric acid, dilute sodium bicarbonate solution and water. After drying over anhydrous sodium sulfate, the solvent was removed by evaporation to give 7.34 g. of the olefinic diol, Compound III, having $$E_{1\ cm.}^{1\%} (232\ m\mu) = 187$$

Example 5

A 1.99-g. portion of phosphorous oxychloride dissolved in 10 ml. of dry toluene was slowly added to 6.6 ml. of pyridine, the mixture being cooled during the addition. A solution of 1.83 g. of the olefinic diol, Compound III, in 50 ml. of dry toluene was then added, and the resulting reaction mixture was heated at 90–95° C. for 75 minutes with rapid stirring. The reaction mixture was then cooled and stirred into 30 g. of crushed ice and ether. The aqueous phase was separated from the ether phase and the aqueous phase extracted with additional ether. The combined ether phases were washed successively with saturated potassium carbonate solution, excess 5% sulfuric acid, and saturated sodium bicarbonate solution. The extract was dried and the solvent removed by evaporation to give 1.1 g. of the enol ether, Compound IV, having $$E_{1\,cm.}^{1\%}\ (372\ m\mu) = 750$$

*Example 6*

A 1.09-g. portion of the enol ether, Compound IV, was dissolved in 10 ml. of acetone containing 2 drops of concentrated hydrochloric acid. The reaction mixture was refluxed for 15 minutes, the acetone removed by evaporation and the residue taken up in ether. The ether solution was washed successively with saturated sodium bicarbonate solution, and water, dried over anhydrous sodium sulfate and the ether removed by evaporation to give 0.95 g. of the Compound V, having $$E_{1\,cm.}^{1\%}\ (328\ m\mu) = 900$$

*Example 7*

Compound V was rearranged to vitamin A aldehyde by dissolving 0.83 g. of Compound V in petroleum ether, and passing the solution through a column of synthetic sodium aluminum silicate as basic catalyst. Vitamin A aldehyde weighing 0.53 g. and having $$E_{1\,cm.}^{1\%}\ (372\ m\mu) = 820$$

was obtained as product.

*Example 8*

A 1.0 g.-portion of Compound V having $$E_{1\,cm.}^{1\%}\ (328\ m\mu) = 794$$

was dissolved in 5 cc. of benzene to which was added 10 drops of pyridine. The mixture was allowed to stand overnight at room temperature whereupon Compound V was rearranged to vitamin A aldehyde having E max.=370 m$\mu$.

*Example 9*

A 0.8-g. sample of Compound V was dissolved in 6 cc. of ethanol and 9 drops of 0.5 N potassium hydroxide solution were added to the solution. The resulting mixture was allowed to stand at room temperature for 3 hours, and the product was washed with water and dried over sodium sulfate to give vitamin A aldehyde having $$E_{1\,cm.}^{1\%}\ (370\ m\mu) = 527$$

*Example 10*

An 0.84-g. portion of vitamin A aldehyde dissolved in 20 ml. of absolute isopropyl alcohol was added to 10 ml. of absolute isopropyl alcohol containing 1.85 g. of aluminum isopropoxide. The resulting mixture was refluxed at a rate effective to give 10 drops of distillate per minute, additional isopropyl alcohol being added to maintain the volume. After 30 minutes, the distillate no longer gave a positive acetone test with 2,4-dinitrophenyl hydrazine reagent. The reaction mixture was refluxed for an additional 30 minutes and most of the excess isopropyl alcohol was removed under slightly reduced pressure. The residue was cooled, hydrolyzed with cold 5% hydrochloric acid, and extracted with ether. The extract was stabilized with a few crystals of hydroquinone, and then washed successively with saturated sodium bicarbonate solution and water. After being dried, the extract was evaporated to remove the solvent giving 0.85 g. of vitamin A alcohol concentrate as a viscous reddish oil having $$E_{1\,cm.}^{1\%}\ (325\ m\mu) = 1175$$

and a potency by blue color test of 2,120,000 units of vitamin A per gram.

*Example 11*

A preferred embodiment of the invention includes treating Compound V, with a basic reducing agent and rearranging Compound V to vitamin A aldehyde and reducing the vitamin A aldehyde to vitamin A alcohol in a single reaction mixture. In a typical example, 0.63 g. of Compound V dissolved in 6.3 ml. of anhydrous ether was charged into a 40 ml. 3-necked flask equipped with a stirrer, dropping funnel and reflux condenser. To this solution was added as rapidly as possible, 3.8 ml. of a 1 M ethereal solution of lithium aluminum hydride diluted with 3.8 ml. of anhydrous ether. The addition was completed over a period of about 30 seconds during which time the reaction mixture refluxed vigorously. After the addition was completed, the mixture was stirred for one minute, and the excess lithium aluminum hydride was then decomposed by the addition of wet acetone. The mixture was extracted with ether and the ether extract was washed successively with sodium bicarbonate solution and water. The extract was dried over anhydrous sodium sulfate and the solvent removed by evaporation to give a concentrate of vitamin A alcohol having $$E_{1\,cm.}^{1\%}\ (328\ m\mu) = 566$$

*Example 12*

Simultaneous rearrangement and reduction of Compound V was also effected with aluminum alkoxide. To a suspension of 1.35 g. of aluminum isopropoxide in 10 ml. of isopropyl alcohol was added 0.61 g. of Compound V dissolved in 25 ml. of isopropyl alcohol. The resulting reaction mixture was refluxed until the distillate gave a negative acetone test with 2,4-dinitrophenyl hydrazine. The excess alcohol was then distilled off under vacuum, the residue was cooled and the excess aluminum isopropoxide was decomposed by the addition of 20 ml. of 10% sulfuric acid. The mixture was extracted with ether and the ether extract washed to neutrality with water. The ether was removed by evaporation to give a concentrate of vitamin A alcohol having $$E_{1\,cm.}^{1\%}\ (328\ m\mu) = 690$$

*Example 13*

The conversion of the olefinic diol, Compound III, to vitamin A alcohol is desirably effected in a preferred embodiment by treating Compound III with a mixture of a mineral acid and an organic base whereby dehydration, hydrolysis and rearrangement are effected in a single reaction mixture to form vitamin A aldehyde which can then be reduced as described hereinabove. Thus, in a typical example, 40 cc. of methyl ethyl ketone containing 1.45 g. of quinoline and 20 cc. of methyl ethyl ketone containing 1.17 g. of concentrated hydrochloric acid were added to a solution of 11.0 g. of Compound III in 80 cc. of methyl ethyl ketone. The resulting mixture was refluxed for 90 minutes, cooled, poured into 500 cc. of water and extracted with ether. The ether extract was washed successively with 5% hydrochloric acid, 0.5 N potassium hydroxide, and water. The washed extract was then dried and evaporated to give 8.7 g. of vitamin A aldehyde as a reddish oil having $$E_{1\,cm.}^{1\%} (372\ m\mu) = 870$$

*Example 14*

Compound III was similarly converted to vitamin A aldehyde by refluxing for 2 hours a mixture of 1.0 g. of Compound III, 0.092 g. of pyridine and 0.117 g. of concentrated hydrochloric acid in 12 cc. of methyl ethyl ketone. The product was worked up as in the preceding example, and the vitamin A aldehyde concentrate obtained thereby had $$E_{1\,cm.}^{1\%} (369\ m\mu) = 716$$

*Example 15*

A 1.0-g. portion of Compound III was refluxed in 12 cc. of methyl ethyl ketone containing 0.1 g. of piperidine and 0.117 g. of concentrated hydrochloric acid. After a 2 hour reflux, crude vitamin A aldehyde having $$E_{1\,cm.}^{1\%} (368\ m\mu) = 610$$

was obtained.

*Example 16*

A 0.57-g. portion of vitamin A aldehyde was dissolved in 5 ml. of dry ether. To this was added over a 30 sec. interval, 1.06 ml. of a 1 M ethereal solution of lithium aluminum hydride diluted with 1 ml. of dry ether. The mixture was stirred for 1 minute following the addition, and excess lithium aluminum hydride was decomposed by the addition of wet ether, acetone and 5% aqueous hydrochloric acid successively. The mixture was extracted with ether, the ether extract washed with sodium bicarbonate solution and water, and the extract dried over anhydrous sodium sulfate. After removal of the solvent by evaporation, 0.56 g. of crude vitamin A alcohol was obtained having $$E_{1\,cm.}^{1\%} (324\ m\mu) = 860$$

and a vitamin A potency by blue color assay of 1,520,000 units per gram.

The invention thus provides a new combination of method steps which combine to produce vitamin A while minimizing undesirable yield-reducing effects of isomerization, side reactions and the like.

While the invention has been described in considerable detail with reference to certain preferred embodiments thereof, it will be understood that variations and modifications can be effected therein without departing from the spirit and scope of the invention as described hereinabove and as defined in the appended claims.

We claim:

1. In the synthesis of vitamin A, the method which comprises reacting an acetal of acetoacetaldehyde with a propargyl halide in the presence of a metal selected from the class consisting of zinc and mercury-catalyzed magnesium, condensing the resulting reaction product with β-ionone by means of magnesium in a Grignard reaction, and partially hydrogenating the acetylenic linkage of the resulting condensation product and thereby obtaining an olefinic 3,7-diol acetal.

2. The method of synthesizing vitamin A which comprises condensing an acetal of acetoacetaldehyde with a propargyl halide in the presence of mercury-catalyzed magnesium, condensing the resulting reaction product with β-ionone by means of magnesium in a Grignard reaction, subjecting the resulting condensation product to partial hydrogenation effective to reduce the acetylenic linkage of said condensation product to an olefinic linkage by reacting said condensation product with a molecular equivalent of hydrogen in the presence of a hydrogenation catalyst and thereby forming an olefinic 3,7-diol acetal, converting said olefinic 3,7-diol acetal to vitamin A aldehyde by dehydrating and hydrolyzing said olefinic 3,7-diol acetal to an isomer of vitamin A aldehyde and rearranging said isomer to vitamin A aldehyde with a basic catalyst, and reducing said vitamin A aldehyde to vitamin A alcohol.

3. In the synthesis of vitamin A, the steps which comprise condensing a dialkyl acetal of acetoacetaldehyde with a propargyl halide in the presence of mercury-activated magnesium and thereby forming the carbinol, 1,1-dialkoxy-3-methyl-3-hydroxy hex-5-yne, condensing said carbinol with β-ionone in a Grignard reaction with magnesium and thereby forming the acetylenic diol, 1,1 - dialkoxy - 3,7 - dimethyl - 3,7 - dihydroxy - 9 - (2,6,6 - trimethyl cyclohex - 1 - enyl) - nona-ene-5-yne, and partially hydrogenating said acetylenic diol to the olefinic diol, 1,1-dialkoxy-3,7 - dimethyl - 3,7 - dihydroxy - 9 - (2,6,6 - trimethyl - cyclohex - 1 - enyl) - nona - 5,8 - diene.

4. The method of making vitamin A which comprises condensing a dialkyl acetal of acetoacetaldehyde with a propargyl halide in the presence of a member of the group consisting of zinc and mercury-activated magnesium and thereby forming the carbinol, 1,1-dialkoxy-3-methyl-3-hydroxy hex-5-yne, condensing said carbinol with β-ionone by means of magnesium in a Grignard reaction and thereby forming the acetylenic diol, 1,1-dialkoxy-3,7-dimethyl-3,7-dihydroxy-9-(2,6,6 - trimethyl cyclohex-1-enyl)-nona-8-ene-5-yne, partially hydrogenating said acetylenic diol to the olefinic diol, 1,1-dialkoxy-3,7-dimethyl - 3,7 - dihydroxy - 9 - (2,6,6 - trimethyl cyclohex - 1 - enyl) - nona - 5,8 - diene, and converting said olefinic diol to vitamin A alcohol, said converting comprising dehydrating said olefinic diol with a member selected from the class consisting of phosphorous halides and phosphorous oxyhalides and thereby forming the enol ether, 1 - alkoxy - 3,7 - dimethyl - 9 - (2,6,6 - trimethyl cyclohex - 2 - ene - 1 - ylidene) - nona - 1,3,5,7 - tetraene, hydrolyzing said enol ether, and reacting the product of said hydrolyzing with a basic reducing agent and thereby forming vitamin A alcohol.

5. The method of making vitamin A which comprises condensing a dialkyl acetal of acetoacetaldehyde with a propargyl halide in the presence of a member of the group consisting of zinc and mercury-activated magnesium and thereby forming the carbinol, 1,1-dialkoxy-3-methyl-3-hydroxy hex-5-yne, condensing said carbinol with β-ionone by means of a Grignard reaction and thereby forming the acetylenic diol, 1,1-dialkoxy - 3,7 - dimethyl - 3,7 - dihydroxy - 9 - (2,6,6 - trimethyl cyclohex - 1 - enyl) - nona - 8-ene-5-yne, partially hydrogenating said acetylenic diol to the olefinic diol, 1,1-dialkoxy-3,7-dimethyl-3,7-dihydroxy-9-(2,6,6-trimethyl cyclohex-1-enyl)-nona-5,8-diene, and converting said olefinic diol to vitamin A alcohol, said converting comprising heating said olefinic diol in admixture with an ionizable acid and an organic base and thereby forming vitamin A aldehyde, and reducing said vitamin A aldehyde to vitamin A alcohol.

6. The method of making vitamin A which comprises condensing a dialkyl acetal of acetoacetaldehyde with a propargyl halide in the presence of a member of the group consisting of zinc and mercury-activated magnesium and thereby forming the carbinol, 1,1-dialkoxy-3-methyl-3-hydroxy hex-5-yne, condensing said carbinol with β-ionone by means of a Grignard reaction and thereby forming the acetylenic diol, 1,1-dialkoxy - 3,7 - dimethyl - 3,7 - dihydroxy - 9 - (2,6,6 - trimethyl cyclohex - 1 - enyl) - nona - 8 - ene - 5 - yne, partially hydrogenating said acetylenic diol to the olefinic diol, 1,1-dialkoxy-3,7 - dimethyl - 3,7 - dihydroxy - 9 -(2,6,6 - trimethyl cyclohex - 1 - enyl) - nona - 5,8 - diene, and converting said olefinic diol to vitamin A alcohol, said converting comprising dehydrating and hydrolyzing said olefinic diol to the aldehyde, 3,7 - dimethyl - 9 - (2,6,6 - trimethyl cyclohex - 2 - ene - 1 - ylidene) - nona - 2,4,6 - triene - 1 - al, and treating said aldehyde with a basic reducing agent and thereby rearranging and reducing said aldehyde to vitamin A alcohol.

7. In the synthesis of vitamin A, the method of making an olefinic diol which is convertible to vitamin A alcohol by dehydration, hydrolysis and reduction which comprises condensing a dialkyl acetal of acetoacetaldehyde with propargyl bromide in the presence of mercury-catalyzed magnesium and thereby forming the carbinol, 1,1 - dialkoxy - 3 - methyl - 3 - hydroxy hex - 5 - yne, condensing said carbinol with β-ionone by means of an alkyl magnesium halide and thereby forming the acetylenic diol, 1,1-dialkoxy-3,7-dimethyl - 3,7 - dihydroxy - 9 - (2,6,6 - trimethyl cyclohex - 1 - enyl) - nona - 8 - ene - 5 - yne, and partially hydrogenating said acetylenic diol to the olefinic diol, 1,1-dialkoxy-3,7-dimethyl-3,7 - dihydroxy - 9 - (2,6,6 - trimethyl cyclohex-1 - enyl) - nona - 5,8 - diene.

8. The method of making vitamin A which comprises condensing a dialkyl acetal of acetoacetaldehyde with a propargyl halide in the presence of mercury-catalyzed magnesium and thereby forming the carbinol, 1,1-dialkoxy-3-methyl-3-hydroxy hex-5-yne, reacting said carbinol with an alkyl magnesium halide and β-ionone and thereby condensing said β-ionone with said carbinol to form the acetylenic diol, 1,1-dialkoxy-3,7 - dimethyl - 3,7 - dihydroxy - 9 - (2,6,6 - trimethyl cyclohex - 1 - enyl) - nona - 8 - ene - 5 - yne, subjecting said acetylenic diol to catalytic hydrogenation with one molecular equivalent of hydrogen and thereby partially hydrogenating said acetylenic diol to the olefinic diol, 1,1-dialkoxy - 3,7 - dimethyl - 3,7 - dihydroxy - 9 - (2,6,6 - trimethyl cyclohex - 1 - enyl) - nona - 5,8-diene, dehydrating and hydrolyzing said olefinic diol to aldehydic material, and reducing said aldehydic material to vitamin A alcohol with a basic reducing agent.

9. The method of making vitamin A which comprises condensing a dialkyl acetal of acetoacetaldehyde with propargyl bromide in the presence of mercury-catalyzed magnesium, reacting the resulting carbinol with an alkyl magnesium halide and β-ionone and thereby condensing said β-ionone with said carbinol, subjecting the resulting condensation product to catalytic hydrogenation with one molecular equivalent of hydrogen, heating the product of said hydrogenating with an ionizable acid and an organic base and thereby forming vitamin A aldehyde, and reducing said vitamin A aldehyde to vitamin A alcohol.

10. As a new compound useful in the synthesis of vitamin A, 1,1-dialkoxy-3-methyl-3-hydroxy hex-5-yne.

11. The polyene diol, 1,1-dialkoxy-3,7-dimethyl - 3,7 - dihydroxy - 9 - (2,6,6 - trimethyl cyclohex - 1 - enyl) - nona - 8 - ene - 5 - yne.

12. The polyene diol, 1,1-dialkoxy-3,7-dimethyl - 3,7 - dihydroxy - 9 - (2,6,6 - trimethyl cyclohex - 1 - enyl) - nona - 5,8 - diene.

13. The method which comprises condensing a dialkyl acetal of acetoacetaldehyde with a propargyl halide in the presence of a member of the group consisting of zinc and mercury-activated magnesium and thereby forming the carbinol, 1,1 - dialkoxy - 3 - methyl - 3 - hydroxy hex - 5 - yne, condensing said carbinol with β-ionone by means of a Grignard reaction and thereby forming the acetylenic diol, 1,1-dialkoxy-3,7-dimethyl - 3,7 - dihydroxy - 9 - (2,6,6 - trimethyl cyclohex - 1 - enyl) - nona - 8 - ene - 5 - yne, partially hydrogenating said acetylenic diol to the olefinic diol, 1,1-dialkoxy-3,7-dimethyl-3,7-dihydroxy - 9 - (2,6,6 - trimethyl cyclohex - 1 - enyl)-nona-5,8-diene, and dehydrating and hydrolyzing said olefinic diol.

References Cited in the file of this patent

UNITED STATES PATENTS

| Number | Name | Date |
|---|---|---|
| 2,529,498 | Isler | Nov. 14, 1950 |
| 2,577,538 | Milas | Dec. 4, 1951 |
| 2,586,305 | Copenhaver | Feb. 19, 1952 |
| 2,586,306 | Copenhaver | Feb. 19, 1952 |

OTHER REFERENCES

Heilbron, J. Chem. Soc. (England), March 1948, p. 386–393.

Isler, Chimia, vol. 4, May 1950, p. 115.

Prevost et al., Comp. Rend., vol. 230, p. 1186–1188.